Nov. 20, 1951     H. N. RIDER     2,575,469
AUTOMATIC DELUGE VALVE

Filed March 18, 1950     4 Sheets-Sheet 1

INVENTOR.
Harry N. Rider
BY
W. B. Harpman
ATTORNEY.

Nov. 20, 1951     H. N. RIDER     2,575,469
AUTOMATIC DELUGE VALVE

Filed March 18, 1950     4 Sheets-Sheet 4

INVENTOR.
Harry N. Rider.
BY
W. B. Harpman
ATTORNEY.

Patented Nov. 20, 1951

2,575,469

UNITED STATES PATENT OFFICE 2,575,469

AUTOMATIC DELUGE VALVE

Harry N. Rider, Youngstown, Ohio, assignor to "Automatic" Sprinkler Corporation of America, Youngstown, Ohio, a corporation of Delaware Application March 18, 1950, Serial No. 150,478

5 Claims. (Cl. 169—22)

This invention relates to a deluge valve and more particularly to a deluge valve of the automatically actuated type and wherein pressure from the fluid supply source is utilized to hold the valve in closed position.

The principal object of the invention is the provision of a simple and economically constructed automatic deluge valve.

A further object of the invention is the provision of an automatic deluge valve which will respond rapidly to controlling devices in a fire zone so as to release fire extinguishing liquid into distributing piping of a sprinkler system and the like.

A still further object of the invention is the provision of an automatic deluge valve incorporating means for automatic and manual actuation both as to opening and closing of the said valve.

A still further object of the invention is the provision of an automatic deluge valve responsive in operation to increases of pressure in pneumatic thermostats in a fire zone or to remotely situated, manually controlled valves.

The automatic deluge valve shown and described herein comprises an improvement in the art of fire protection and particularly in respect to deluge valves as heretofore known in that art. It has heretofore been thought necessary to provide expensively constructed deluge valves having various forms of clappers normally closing the water supply inlet and which clappers are usually latched and adapted to be released by means such as weights and the like which are automatically released for the indicated purpose.

The present invention relates to an automatic deluge valve which eliminates such heavy, cumbersome, costly constructions and in place thereof provides a simple, relatively small, lightweight, inexpensively formed construction utilizing fluid pressure from the inlet source for normally maintaining the clapper in closed position with respect thereto. The deluge valve is operable from heat actuated thermostats in the fire zone or alternately by manual operated valves at any desired location, the said manual valves also operating to close the automatic deluge valve once it is operated automatically or manually. The automatic deluge valve is particularly suitable for fire extinguishing installations in connection with relatively localized hazards such as in connection with fire extinguishing fog systems or foam systems and wherein rapid operation and dependability are of paramount importance and wherein lightweight, relatively small valve constructions are desirable as considerable numbers of them may be employed in a single establishment to supervise and control a plurality of localized hazardous areas.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figure 1:
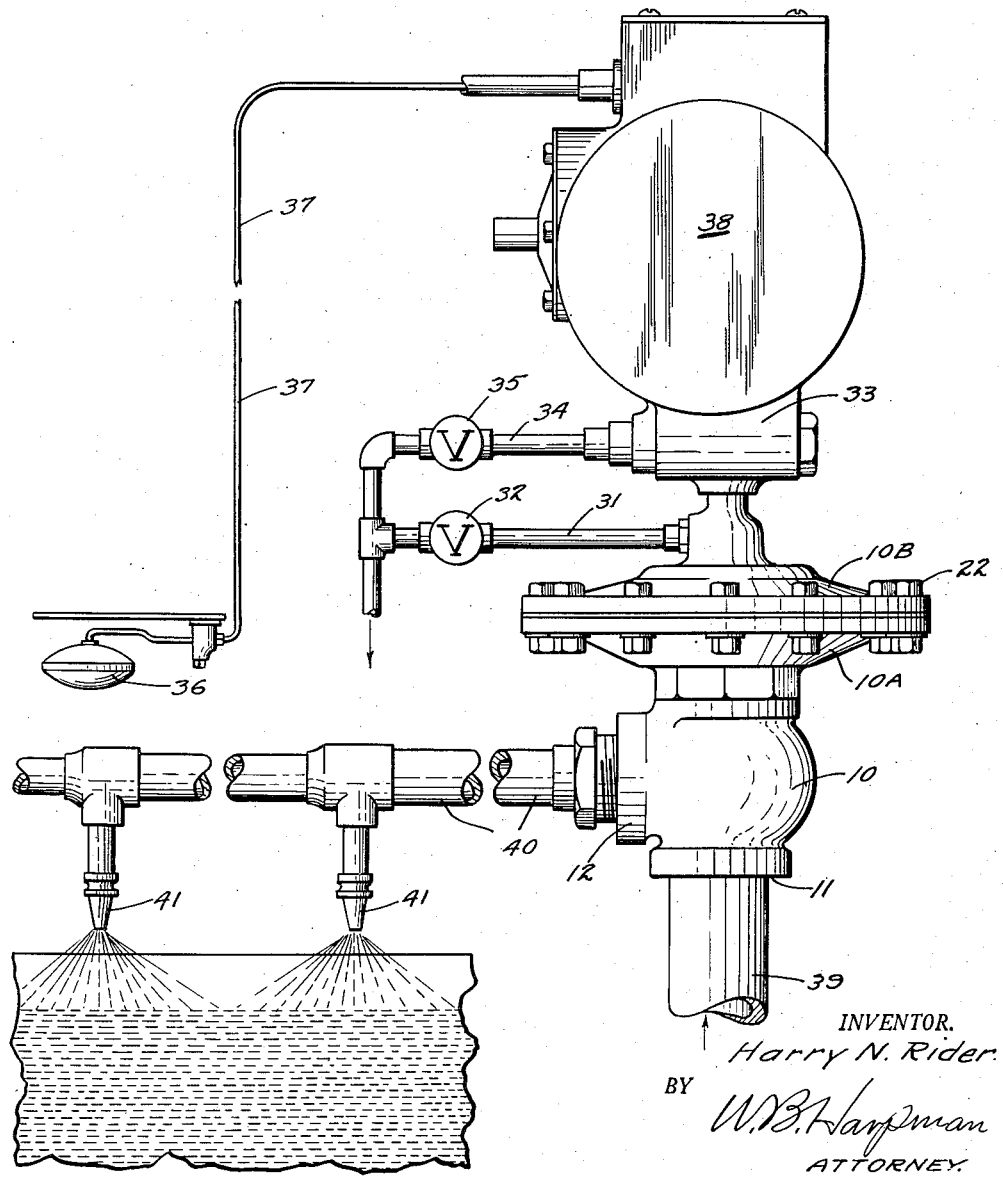
Figure 1 is a side elevation of the automatic deluge valve.
Figure 2:
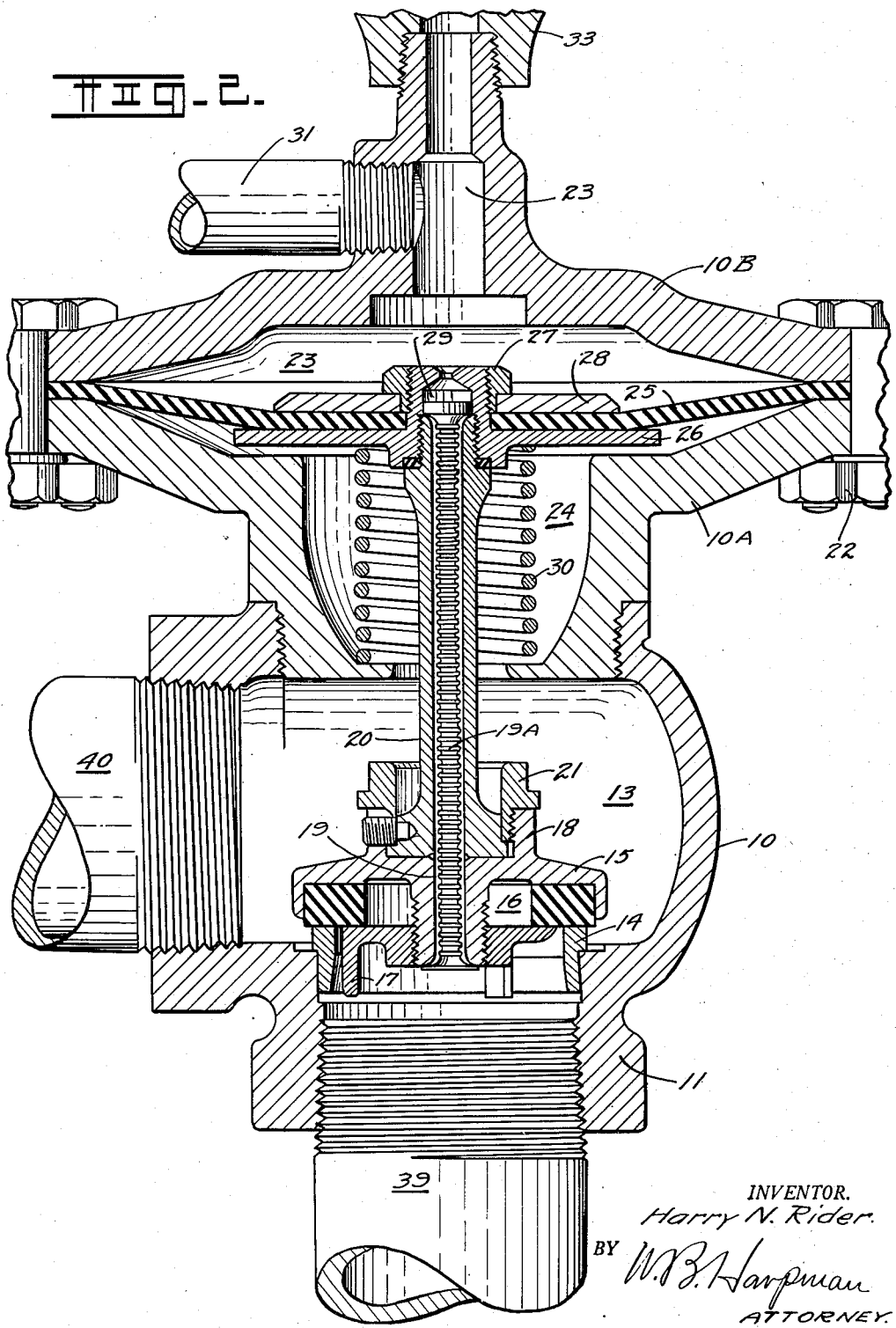
Figure 2 is an enlarged vertical cross section of a portion of the automatic deluge valve shown in Figure 1.
Figure 3:
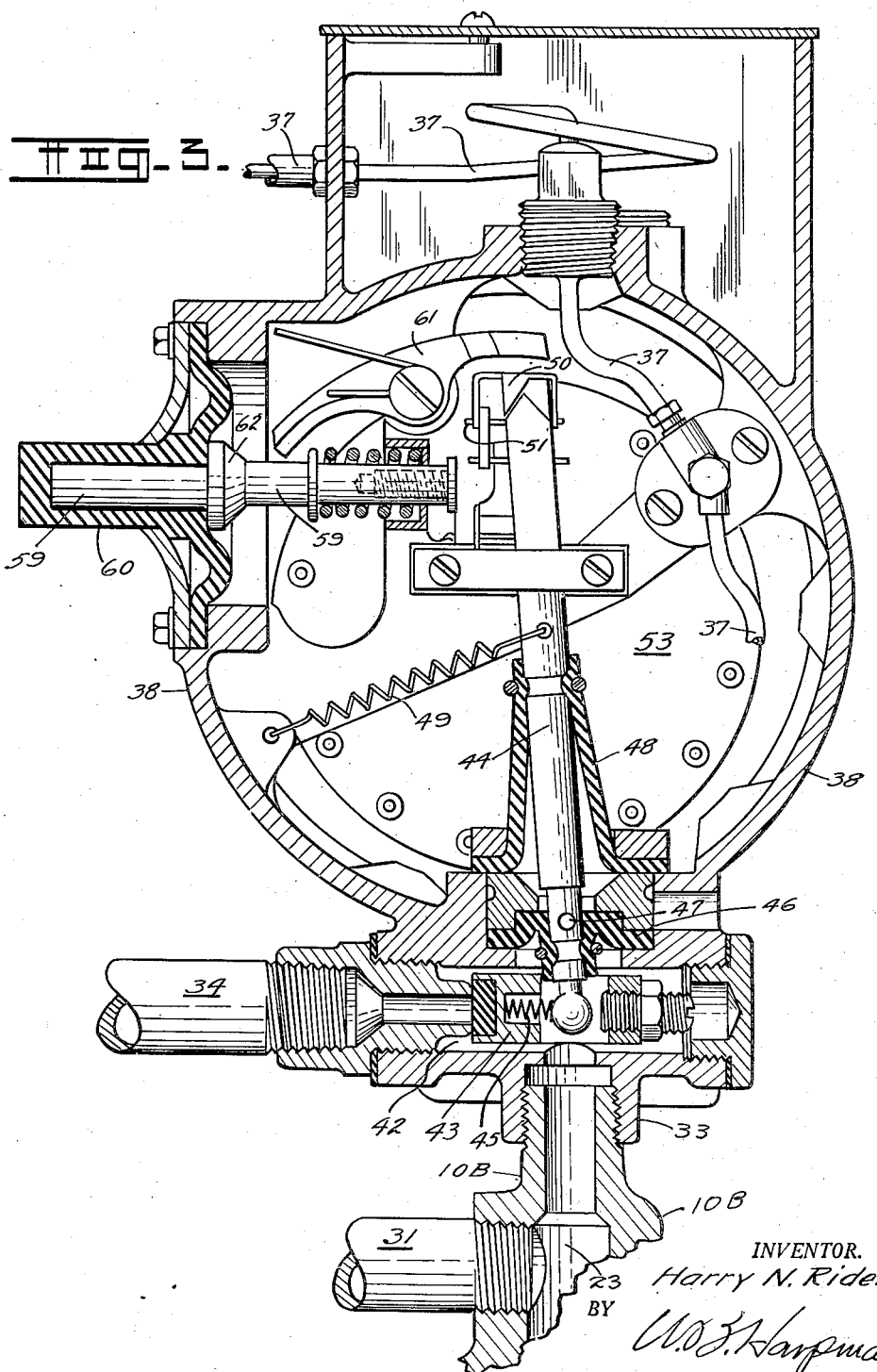
Figure 3 is an enlarged vertical section of a portion of the automatic valve shown in Figure 1.

By referring to the drawings and Figures 1, 2 and 3 in particular it will be seen that the automatic deluge valve comprises a valve body 10 having a water inlet 11 and a water outlet 12, the body 10 defining a chamber 13 establishing communication between the inlet 11 and the outlet 12 and locating a valve seat ring 14 against which a clapper 15 is normally seated. The clapper 15 is provided with a suitable gasket 16 and a plurality of depending guides 17 to insure alignment of the clapper 15 with the valve seat ring 14 heretofore referred to. The clapper 15 is provided with an upstanding threaded boss 18 and a central vertical opening 19 to which a hollow stem 20 is flexibly connected by a flexible tube 19A. The hollow stem 20 is loosely secured to the clapper 15 by a retaining ring 21. The opening 19, the flexible tube 19A and the hollow stem 20 thus form a passageway through the clapper 15.

By referring again to Figure 1 of the drawings it will be observed that the central uppermost portion of the automatic deluge valve comprises a pair of oppositely flared body members 10A and 10B secured to each other by a plurality of bolt and nut assemblies 22. The body members 10A and 10B form a pair of chambers, as best seen by referring to Figure 2 of the drawings, the uppermost chamber of which is indicated by the numeral 23 and the lowermost chamber by the numeral 24. The chambers 23 and 24 are separated by a flexible diaphragm 25 which in turn is flexibly secured to the uppermost end of the hollow stem 20 by means of a disc 26 which is threadably engaged thereon and a retaining nut 27 and washer 28 threadably engaged on an upstanding portion of the disc 26. The disc 26 has a restricted opening 29 therethrough and the flexible tube 19A is in communication therewith so that fluid pressure from the inlet 11 of the valve will flow upwardly through the opening 19 in the clapper 15, the flexible tube 19A in the hollow stem 20 and the opening 29 in the disc 26 and into the chamber 23 where it will cause the diaphragm 25 to move downwardly and hold the clapper 15 on the seat ring 14 of the valve body 10.

A coil spring 30 is positioned between a portion of the valve body 10A and the disc 26 and normally urges the clapper 25 upwardly so that at such time as fluid pressure in the chamber 23 is relieved or allowed to equalize with that in the inlet 11 of the valve, the spring 30 will move the disc 26 and diaphragm 25 upwardly and hence move the clapper 15 to open position.

By referring again to Figure 1 of the drawings it will be seen that means is provided for effecting the release of such pressure both automatically and manually. The manual means comprises an exhaust line 31 communicating with the chamber 23 and normally closed by a valve 32. The chamber 23 is also in communication with an automatically actuated valve 33 located immediately thereabove and which automatic valve 33 communicates with an exhaust line 34 which is normally open and is provided with a manual control valve 35. The automatic valve 33 is arranged for automatic actuation responsive to increase of pressure from pneumatic thermostats in the fire zone.

Still referring to Figure 1 of the drawings it will be seen that a heat actuated device is indicated by the numeral 36 and that it communicates by way of tubing 37 with the automatic valve 33 and more particularly the operating mechanism thereof enclosed in a housing 38. The automatic deluge valve shown in Figure 1 of the drawings is in communication with a water supply source 39 and the outlet 12 of the valve is in communication with distributing piping 40 which is illustrated as having a plurality of fog nozzles 41 in communication therewith although any other form of water distributing device may be employed. The automatic valve shown in Figure 1 of the drawings is thus illustrated in connection with a preferred form of sprinkler system of the type generally used for localized applications.

By referring now to Figures 2 and 3 of the drawings it will be seen that the uppermost portion of the automatic deluge valve comprises the automatic control valve 33 and the actuating mechanism therefor enclosed in the housing 38. The automatic control valve 33 includes a chamber 42 and a movable valve element 43 disposed therein. The chamber 42 forms a communication means between the chamber 23 and the valve body 10B, heretofore described, and the exhaust pipe 34. The valve element 43 is normally closed with respect to the outlet communicating with the exhaust pipe 34 so that fluid pressure in the chamber 23 is retained therein.

Figure 4:
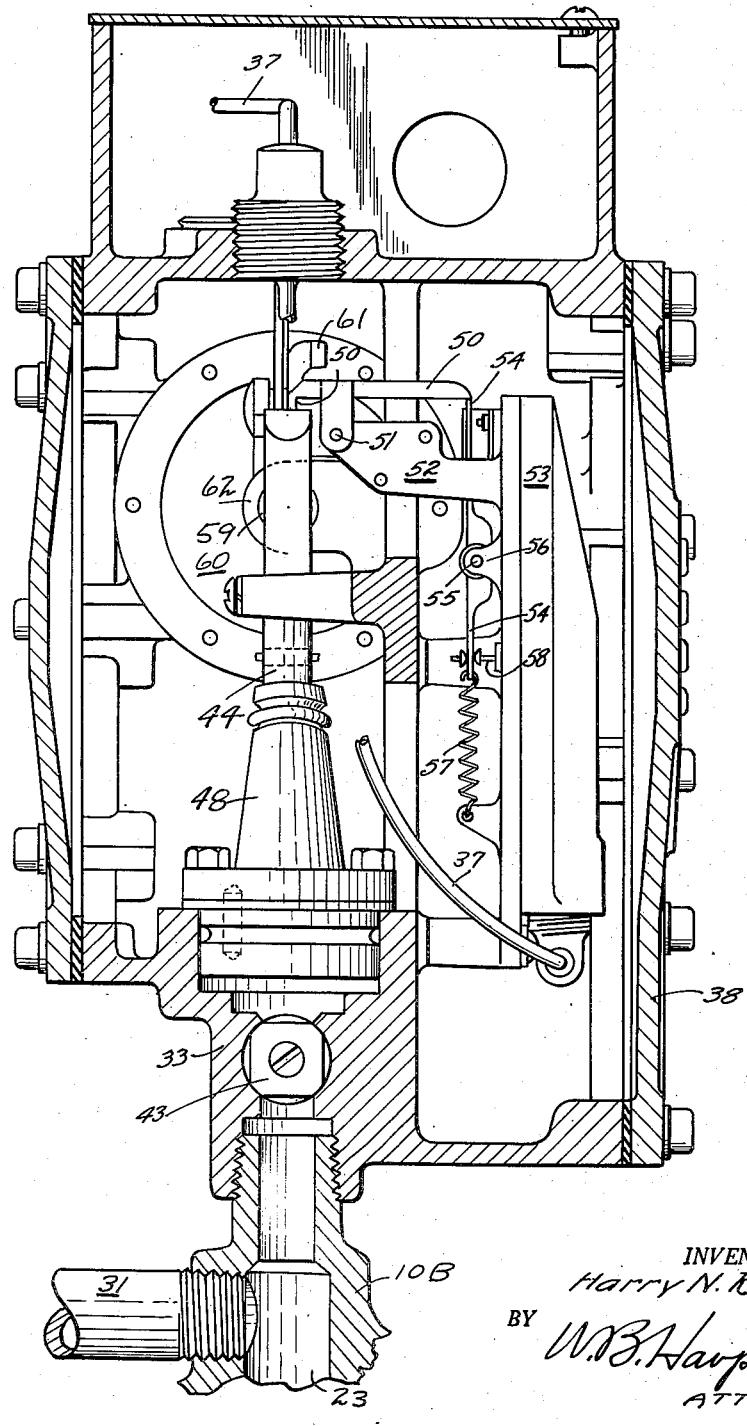
Figure 4 is a vertical section taken on line 4—4 of Figure 3.

Means for moving the valve element 43 is provided and includes a lever 44, the lower end of which engages an opening formed in the valve element 43 and is indirectly connected thereto by way of a coil spring 45. The lever 44 extends upwardly out of the chamber 42 and a packing gland 46 is provided to insure a water-tight closure with respect thereto. A pivot pin 47 is also located through the lever 44 and in the area of the packing gland 46 and provides a point of leverage over which the lever 44 fulcrums in moving the valve element 43 from side to side, as best shown in Figure 3 of the drawings. The lever 44 is also provided with a secondary liquid sealing means comprising a boot 48 secured thereabout and to the upper portion of the valve body 33. The lever 44 is normally urged to the left as shown in the drawings by a coil spring 49 and is prevented from moving toward the left by a tiltable latch 50 which is pivoted by a pivot 51 to supporting arms 52 formed on a diaphragm case 53 which is located within the housing 38 as heretofore described. The tiltable latch 50 is normally held in horizontal relation with the latch portion engaged against an upwardly tapered surface, as best shown in Figure 4 of the drawings, by a movable detent 54, which movable detent is pivoted as at 55 to arms 56 formed on the diaphragm case 53 heretofore referred to.

It will thus be seen that at such time as a fire occurs in the area supervised by the heat actuated device 36 an increase of pressure is occasioned in the diaphragm case 53 of the automatic valve which results in the opening of the valve element 43 in the automatic valve 33 of the device and the venting of pressure from the chamber 23 to the exhaust line 34 more rapidly than the pressure may be replenished through the restricted opening 29. When this occurs the pressure in the chamber 23 of the automatic valve equalizes with that of the inlet pressure of the fluid supply in communication therewith and the spring 30 then elevates the clapper 15 and permits water from the supply source to flow through the valves, for example; to the distributing piping 40 as shown in Figure 1 of the drawings.

It will be obvious to those skilled in the art that the manual control valve 35 on the exhaust line 34 is normally open and that in order to shut off the automatic deluge valve, this valve 35 is manually closed, fluid pressure is re-established in the chamber 23 and the diaphragm 25 is thereby deflected downwardly to close the clapper 15. At this time the actuating portion of the automatic deluge valve is reset for subsequent automatic action by manual movement of a reset lever 59, a portion of which extends out of the housing 38 in a suitable enclosing resilient jacket 60.

As best shown in Figure 3 of the drawings, movement of the resetting lever 59 inwardly of the device will engage it upon the lever 44 and move the same back to position wherein the valve element 43 is closed and the latch lever 50 can again engage the lever 44 to hold it in such position. The re-positioning of the tiltable latch lever 50 is insured by the provision of a pivoted reset lever 61, one end of which engages the reset lever 59 and is adapted to be moved vertically by a cam 62 thereon and the other end of which is positioned immediately above the tiltable latch lever 50 so as to be moved downwardly thereagainst to cause the resetting of the same on the lever 44.

The automatic deluge valve is also capable of remote actuation by reason of the manual valve 32 in the exhaust line 31 which is normally closed. If, for example, fire is observed in the area supervised by the automatic deluge valve, the manual valve 32 may be opened to release pressure from the chamber 23 and thereby permit the operation of the deluge valve as heretofore described. Closing of the valve 32 will again re-establish pressure in the chamber and thus cause the closing of the automatic deluge valve.

The automatic deluge valve disclosed herein is capable of both automatic and manual actuation as in opening the valve to bring it into operation in controlling a fire. It is also subject to automatic and manual operation in closing the valve as necessary at such time as a fire in the controlled area has been extinguished. It will be obvious that the valves 32 and 35 heretofore referred to may be remotely located with respect to the actual location of the automatic deluge valve and that they will work efficiently for their intended purpose despite such remote location.

It will thus be seen that the several objects have been met by the automatic deluge valve disclosed herein.

Having thus described my invention, what I claim is:

1. An automatic deluge valve having a fluid passageway therethrough and a clapper movably positioned in said passageway for closing the same, a pressure chamber in said valve and a diaphragm positioned across said pressure chamber, structural means connecting said diaphragm and said clapper, a restricted secondary fluid passageway in said structural connection means establishing communication through said clapper with said pressure chamber for normally holding said diaphragm and clapper in closed position and spring means normally urging said diaphragm and clapper to open position, an outlet in communication with said pressure chamber and valve means controlling the same.

2. An automatic deluge valve comprising a valve body having a fluid passageway therethrough and a clapper reciprocally positioned in said valve body for movement into the said fluid passageway so as to normally close the same, a diaphragm in said valve body, an opening through said clapper and a hollow stem defining a restricted passageway affixed to said clapper and communicating with said opening and affixed to said diaphragm and communicating with the area on the side thereof opposite from the said clapper, spring means in the said valve body urging the said diaphragm and clapper toward open position, a vent in said valve body communicating with the area on the side of the diaphragm opposite from the said clapper and valve means controlling said vent.

3. A deluge valve of the pressure actuated type comprising an L-shaped body member defining inlet and outlet openings, a secondary body member affixed to said L-shaped body member and in spaced alignment with said inlet opening, a third body member affixed to said secondary body member and forming a chamber therebetween, a diaphragm positioned between the said secondary and third body members, a hollow stem defining a restricted passageway secured to said diaphragm and establishing communication therethrough and extending into the said first mentioned body member, a clapper having an opening therein affixed to the hollow stem to establish communication between said inlet opening and the said hollow stem, said clapper registrable with said inlet opening for closing the same whereby fluid pressure from the said inlet opening communicates with the area in the third body member on the opposite side of the said diaphragm from the said clapper and thereby holds the said clapper in closed position on the said inlet opening, and means for venting pressure from the said area in the third body member to permit the clapper to be moved to open the fluid passageway through the said L-shaped body member.

4. An automatic deluge valve comprising a body member having two chambers therein, one of said chambers having inlet and outlet openings therein and forming a fluid passageway therethrough, the other of the said chambers having a diaphragm positioned thereacross and dividing the same into two sub-chambers, one of which communicates with the first mentioned chamber, the second sub-chamber being formed on the opposite side of the said diaphragm, a rigid stem affixed to said diaphragm and extending into the first mentioned chamber, a clapper secured to the said rigid stem and engaged with the said inlet opening in the said fluid passageway to close the same, a secondary restricted passageway formed through the said clapper, rigid stem and diaphragm to establish communication between the said inlet of the said valve and the sub-chamber on the opposite side of the said diaphragm, and spring means positioned in the said body member and urging the said diaphragm, stem and clapper away from the said inlet orifice, a valve controlled vent in communication with the said sub-chamber on the side of the diaphragm opposite from the said clapper for controlling fluid pressures in said sub-chamber and the operation of the said clapper thereby.

5. An automatic deluge valve comprising a body member having two chambers therein, one of said chambers having inlet and outlet openings therein and forming a fluid passageway therethrough, the other of the said chambers having a diaphragm positioned thereacross and dividing the same into two sub-chambers, one of which communicates with the first mentioned chamber, the second sub-chamber being formed on the opposite side of the said diaphragm, a flexible stem affixed to said diaphragm and extending into the first mentioned chamber, a clapper secured to the said flexible stem and engaged with the said inlet opening in the said fluid passageway to close the same, a restricted secondary passageway formed through the said clapper, flexible stem and diaphragm to establish communication between the said inlet of the said valve and the sub-chamber on the opposite side of the said diaphragm, and spring means positioned in the said body member and urging the said diaphragm, stem and clapper away from the said inlet orifice, a valve controlled vent in communication with the said sub-chamber on the side of the diaphragm opposite from the said clapper for controlling fluid pressures in said sub-chamber and the operation of the said clapper thereby.

HARRY N. RIDER.

REFERENCES CITED

The following references are of record in the file of this patent:

UNITED STATES PATENTS

| Number | Name | Date |
| --- | --- | --- |
| 687,148 | Fortier | Nov. 19, 1901 |
| 1,955,685 | Rowley | Apr. 17, 1934 |